United States Patent [19]

Ogano et al.

[11] Patent Number: 4,716,717
[45] Date of Patent: Jan. 5, 1988

[54] POWER LAWN MOWER

[75] Inventors: Takeo Ogano; Yoshihiro Toda; Masato Mukainakano; Mikio Shoji, all of Saitama, Japan

[73] Assignee: Honda Giken Kogyo Kabushiki Kaisha, Tokyo, Japan

[21] Appl. No.: 828,232

[22] Filed: Feb. 10, 1986

[30] Foreign Application Priority Data

Feb. 8, 1985 [JP] Japan ............... 60-16919[U]
Feb. 8, 1985 [JP] Japan ............... 60-23120

[51] Int. Cl.⁴ ............................................. A01D 69/08
[52] U.S. Cl. ...................................... 56/255; 56/11.8
[58] Field of Search .............. 56/11.1, 11.3, 11.8, 56/255

[56] References Cited

U.S. PATENT DOCUMENTS

| | | | |
|---|---|---|---|
| 3,378,995 | 4/1968 | Welsh | 56/255 |
| 3,524,307 | 8/1970 | Dahl | 56/255 |
| 3,818,686 | 6/1974 | Hattner et al. | 56/255 |
| 3,903,679 | 9/1975 | Sorenson et al. | 56/255 |
| 4,048,787 | 9/1977 | Harkness et al. | 56/255 |

Primary Examiner—Stephen J. Novosad
Assistant Examiner—William P. Neuder
Attorney, Agent, or Firm—Irving M. Weiner; Joseph P. Carrier; Pamela S. Burt

[57] ABSTRACT

There is disclosed a power lawn mower which comprises a carriage having a top deck and side walls, a pair of front wheels, a pair of rear wheels having corresponding wheel axle shafts, a cutting mechanism having a rotary cutting element, a prime mover mounted on the top deck of the carriage and having an output shaft drivingly connected to the cutting element to rotate the same, and a rear wheel drive mechanism for transmitting driving power of the prime mover to the rear wheels and including at least one drive shaft. In this arrangement, the carriage includes front and rear openings. The front wheels are independently supported on the front portion of the carriage and the rear wheels are independently supported on the rear portion of the carriage. Further, front and rear guard members are swingably mounted to the lower surface of front and rear portions of the top deck, respectively.

3 Claims, 4 Drawing Figures

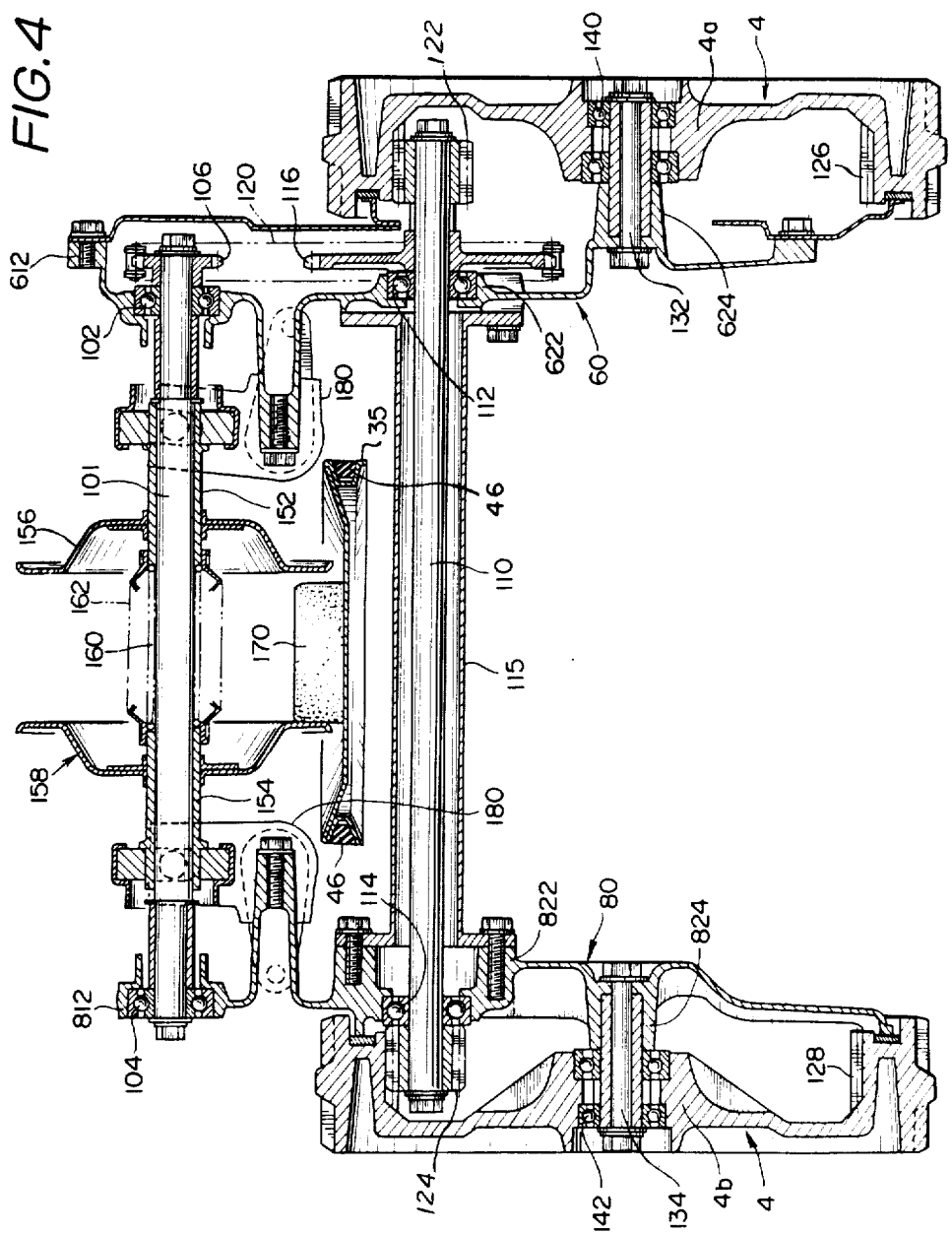

POWER LAWN MOWER

BACKGROUND OF THE INVENTION

1. Field of the Invention

The present invention relates to improvements in a power lawn mower for mowing lawns or cutting vegetation.

2. Description of the Related Art

It is well known to provide a power operated lawn mower wherein a cutting element is driven for rotation by means of a suitable prime mover to sever grass particles or other vegetation at a predetermined height above the ground. Such a cutting element may either be a rigid steel blade or a flexible mono-filament line. Also, a prime mover may either be an integral combustion engine or an electric motor. One example of such power operated lawn mowers is shown in U.S. Pat. No. 4,244,160. The patented mower generally comprises a blade housing supported by ground wheels and having a topwall and front and rear aprons, and an internal combustion engine mounted on the topwall of the housing and having a vertical output shaft to which a cutting blade is fixed. An opening is located at one side of the housing. The top of the housing is formed to define a clipping guide channel which generally increases in height from a location at the rear of the housing to a discharge opening at the opening therein. A bagging or discharge chute is disposed in covering relation to the opening and in clipping-receiving relation to the discharge opening of the channel, and has an upwardly and rearwardly inclined clipping conveying duct. However, provision of such discharge chute on the housing not only prevents small and compact arrangement of the mower, but deteriorates its appearance as well. Moreover, the lower ends of the front and rear aprons of the housing are spaced only a short distance from the ground. It is for these reasons that such housing is unable to accommodate relatively tall lawns and sever the same at a uniform height.

SUMMARY OF THE INVENTION

Accordingly, it is an object of the present invention to provide a new and improved power lawn mower which requires no discharge chutes and related parts, thus bringing the same into a small and compact arrangement.

It is another object of the present invention to provide an improved power lawn mower which is enabled to sever relatively tall lawns upon to-and-fro of the mower while smoothly discharging grass cuttings.

It is a further object of the invention to provide a power lawn mower which may prevent damage to a cutting blade due to debris or foreign objects.

Still another object of the invention resides in a power lawn mower which is lightweight, economical and attractive in appearance.

In accordance with the present invention, a power lawn mower comprises a carriage having a top deck and side walls, a pair of front wheels, a pair of rear wheels having a corresponding pair of wheel axle shafts, a cutting mechanism having a rotary cutting blade, a prime mover mounted on the top deck of the carriage having an output shaft drivingly connected to the cutting blade to rotate the cutting blade and a rear wheel driving power mechanism for transmitting drive of the prime mover to the rear wheels and including at least one drive shaft. The carriage includes front and rear openings. The front and rear wheels are independently supported on the front and rear portions of the carriage respectively. Further, the drive shaft is located above and forwardly of the wheel axle shafts. Also, front and rear guard members are swingably mounted to the undersides of forward and rearward portions of the top deck.

BRIEF DESCRIPTION OF THE DRAWINGS

Other objects, aspects and advantages of the present invention will become more apparent from the following detailed description taken in conjunction with the accompanying drawings, in which:

FIG. 4 is a vertical sectional view of a rear wheel drive mechanism of the power lawn mower of FIG. 1.

DETAILED DESCRIPTION OF THE PREFERRED EMBODIMENT

Figure 1:
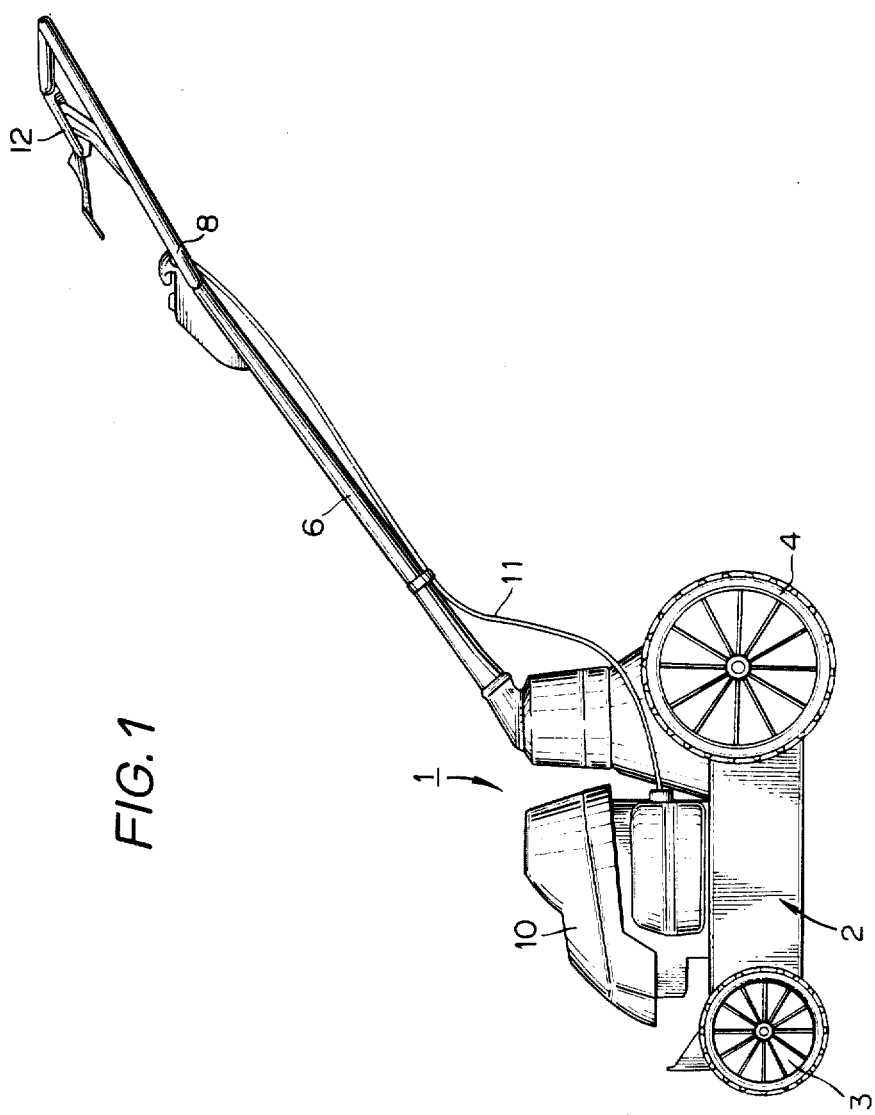
FIG. 1 is a pictorial representation of a power lawn mower according to the present invention.

Referring now to the drawings and initially to FIG. 1, there is shown schematically a power lawn mower 1 which comprises a housing or carriage 2 supported on a pair of front wheels 3 and a pair of rear wheels 4. For the purpose of guiding the power lawn mower 1 on a lawn, the carriage 2 is interconnected by a rearwardly and upwardly extending tube 6 to a handle assembly 8. An engine 10 is mounted on the carriage 2 and is controlled through a cable 11 by a control mechanism 12. Whilst the engine 10 is shown as being an internal combustion engine, it will be understood that other power means such as an electric motor may be used. The engine 10 also has a vertical output shaft 15 (FIG. 2).

Figure 2:
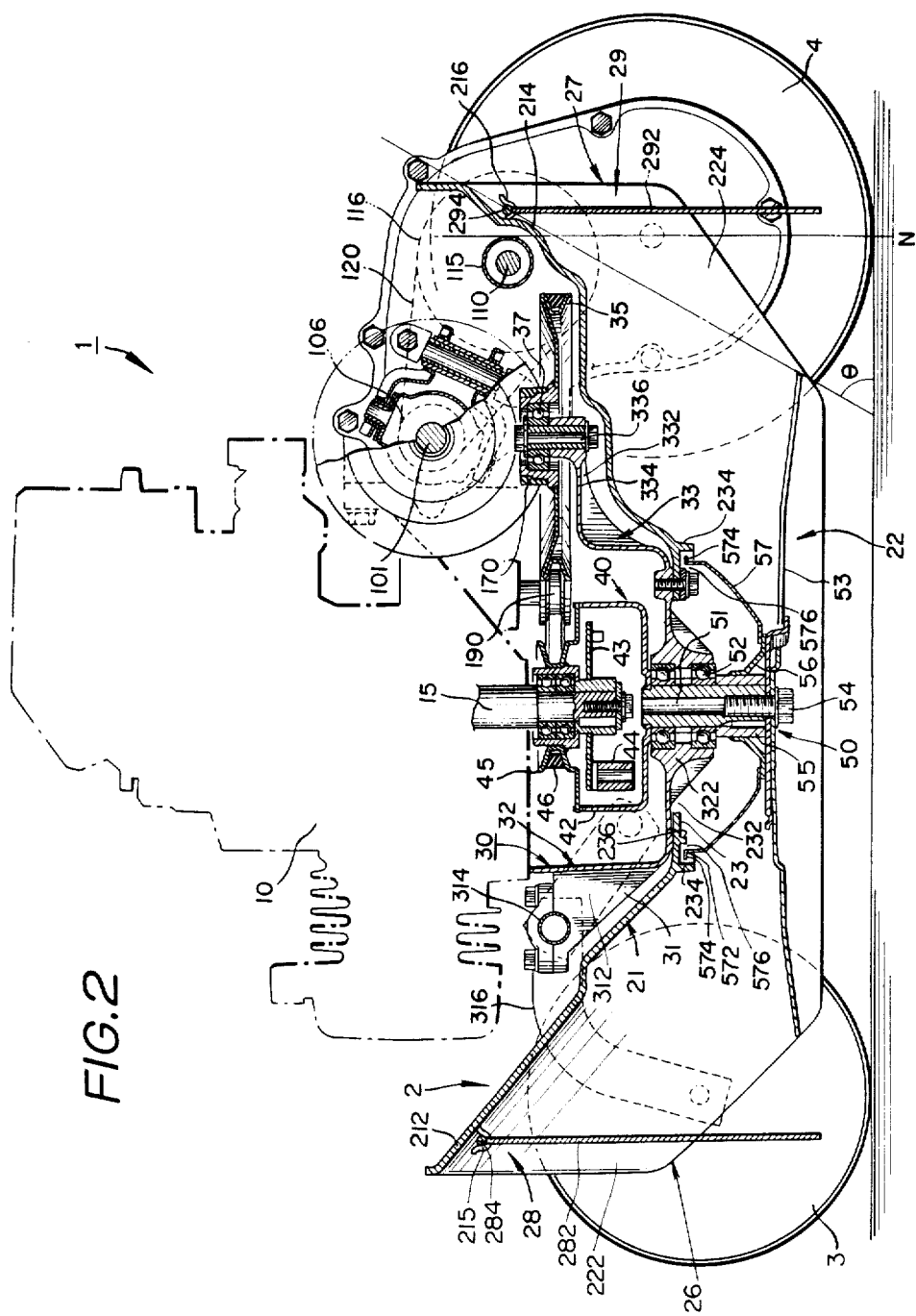
FIG. 2 is a vertical sectional view of the power lawn mower, an internal combustion engine by which a cutting blade is driven for rotation being schematically shown in phantom.

In FIG. 2, the carriage 2 has a top deck 21 and side walls 22, 22. The deck 21 has a central portion 23 with an aperture 232 therein. Annular projections 234 and 236 are concentrically provided on the underside of the central portion 23. The deck 21 also has a forwardly and upwardly inclined portion 212 and an rearwardly and upwardly inclined portion 214. The side walls 22, 22 have forwardly and upwardly inclined ends 222, 222 and rearwardly and upwardly inclined ends 224, 224 so as to define wide front and rear openings 26 and 27 at the front and rear of the carriage 2 respectively in cooperation with the forward and rearward portions 212 and 214 of the deck.

In the illustrated embodiment, a pair of front hooks 215, 215 are secured in spaced relation to the lower surface of the forward portion 212 of the deck 21. A front guard member 28 has a plate 282 and a shaft 284 integrated in the plate 282, and is adapted to close the front opening 26 in the carriage 2. The front guard member 28 is swingably mounted on the lower surface of the forward portion 212 of the deck 21 upon engagement of the shaft 284 with the front hooks 215, 215. Likewise, a pair of rear hooks 216, 216 are secured in spaced relation to the lower surface of the rearward portion 214 of the deck 21. A rear guard member 29 has a plate 292 and a shaft 294 integrated in the plate 292. The rear guard member 29 is swingably mounted on the lower surface of the deck 21 to close the rear opening 27 in the carriage 2. The lower ends of the front and rear guard members 28 and 29 and those of the side walls 22, 22 are substantially equally spaced from the ground. It will be appreciated that the front and rear guard members 28 and 29 are intended to prevent damage to a cuttng mechanism, especially a cutting blade due to debris or other foreign objects.

Figure 3:
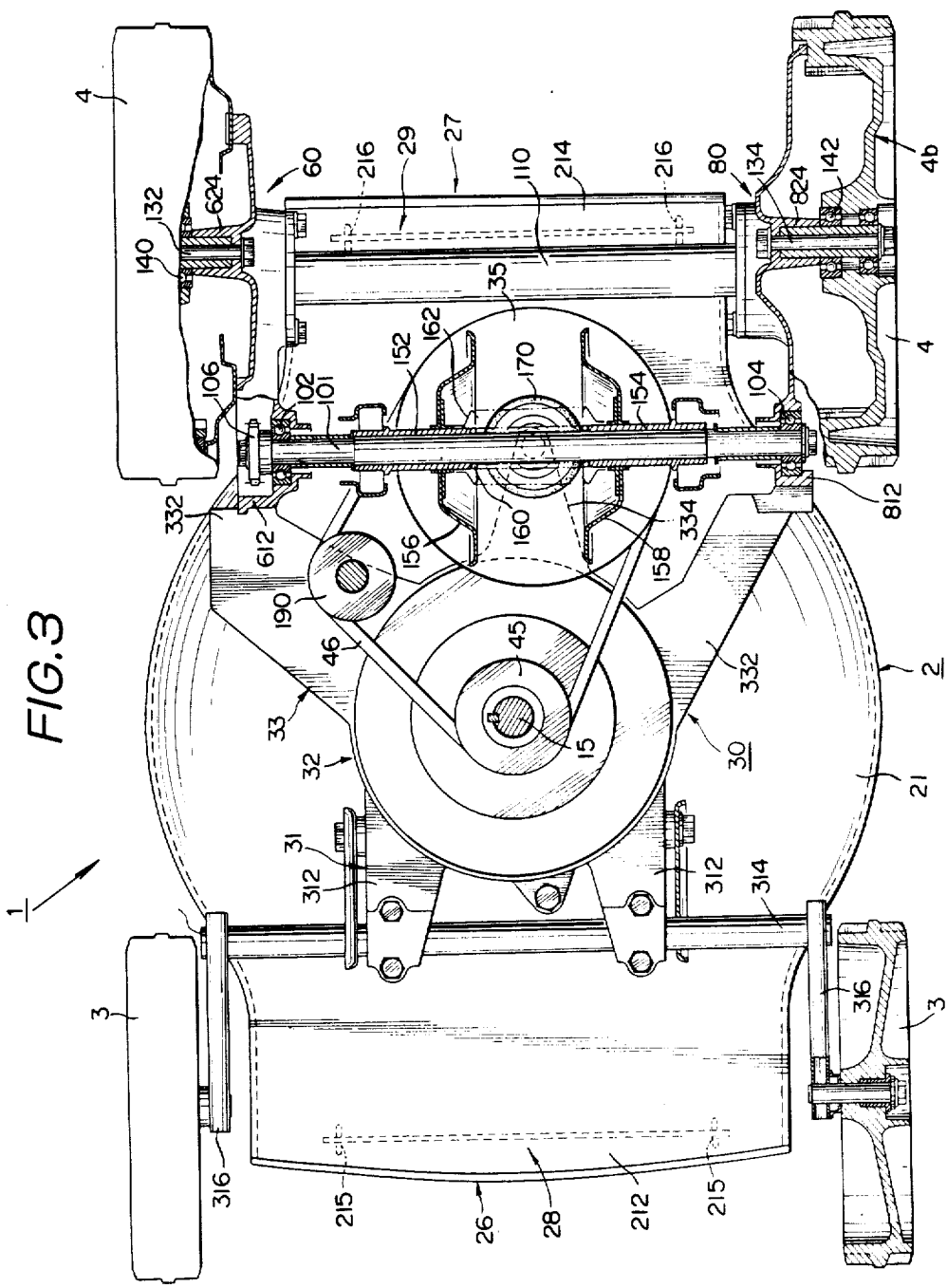
FIG. 3 is a top plan view, partly in section, of the power lawn mower.

A frame 30 rests on the central portion 23 of the carriage 2, and includes a front, intermediate and rear portions 31, 32 and 33 as best seen in FIG. 3. The front portion 31 has two arms 312, 312 forwardly projecting from the intermediate portion 32 and adapted to support a shaft 314 thereon. Downwardly extending stays 316, 316 are fixedly mounted on corresponding ends of the shaft 314 to independently support the front wheels 3, 3. The intermediate portion 32 is of cylindrical configuration, and is integrally formed at its center with a boss 322. The rear portion 33 of the frame 30 has also two arms 332, 332 generally rearwardly and upwardly projecting from the intermediate portion 32 and a triangular projection 334 projecting rearwardly therefrom and having an upstanding shaft 336 at its rear end. A large-diameter pulley 35 is mounted via a suitable bearing assembly as at 37 to the upstanding shaft 336 to rotate therewith.

A clutch mechanism 40 is housed in the intermediate portion 32 of the frame 30, and generally includes a clutch drum 42, a clutch shoe driver 43 and clutch shoes 44. The end of the output shaft 15 is drivingly connected to the clutch shoe driver 43. Fixedly mounted on the clutch drum 42 is a small-diameter pulley 45. A belt 46 passes around the the pulleys 35 and 45 as best seen in FIG. 3.

A cutting mechanism 50 is provided on the underside of the central portion 23 of the deck 21 in the carriage 2. The cutting mechanism 50 generally includes a cutter shaft 51 extending downwardly from the underside of the clutch drum 42 in coaxial relation to the output shaft 15 of the engine 10, and is supported by a suitable bearing assembly as at 52 provided at the boss 322 of the frame 30. The cutting blade 53 has substantially the same radial dimensions as the central portion 23 of the carriage 2, and is secured by a bolt 54 to the lower end of the cutter shaft 51 to rotate therewith. A sleeve 55 is fixed to the cutter blade 53 to cover the lower portion of the cutting blade 53 and a truncated cone or stay 56 is adapted to surround the sleeve 55. Further, a cover 57 is fixedly attached to the stay 56 to rotate with the cutting blade 53. The peripheral edge of the cover 57 is folded outwardly at 572 to form a flanged end 574. The flanged end 574 terminates a short distance radially from the annular projections 234 and 236 respectively and also, is spaced a short distance vertically from the underside of the central portion 23 of the carriage 2, thus forming therein a folded path 576 or what is commonly termed "labyrinth" to prevent intrusion of foreign objects and grass cuttings into the cutting mechanism 50.

In FIGS. 3 and 4, right and left casings 60 and 80 have base ends 612 and 812 adjacent the engine 10. A first drive shaft 101 extends between the base ends 612 and 812 of the casings 60 and 80. The opposite ends of shaft 101 are rotatably supported by suitable bearing assemblies as at 102, 104. A small-diameter sprocket 106 is keyed to one end of the first drive shaft 101 projecting outwardly from the bearing 102. Bosses 622 and 822 are formed at the intermediate portion of the casings 60 and 80 respectively. A second drive shaft 110 extends between the bosses 622 and 822. The opposite ends of the shaft 101 are rotatably supported by suitable bearing assemblies 112, 114 as best seen in FIG. 4. A tube 115 is adapted to cover the second drive shaft 110 and also, serves as a cross member between the bosses 622 and 822. A large-diameter sprocket 116 is keyed to one end of the second drive shaft 110 projecting outwardly from the bearing 112. A chain 120 encircles the sprockets 106 and 116. Pinions 122, 124 are fixedly mounted on opposite ends of the second drive shaft 110 to mesh with corresponding internal gears 126, 128 formed on the inner peripheral surfaces of the rear wheels 4, 4. Bosses 624, 824 project outwardly from the lower portions of the right and left casings 60 and 80 respectively. Wheel axle shafts 132, 134 are fixedly connected to the bosses 624, 824 via suitable bearing assemblies as at 140, 142 and thereby support hubs 4a, 4b of the rear wheels 4, 4. It will be appreciated that neither of the wheel axle shafts 132, 134 projects radially and inwardly from the casings 60 and 80, and that the wheel axle shafts 132, 134 independently drivingly support the corresponding rear wheels 4, 4. It will also be appreciated that the second drive shaft 110 is located well above the wheel axle shafts 132, 134 and forwardly of a vertical line N crossing the wheel axle shafts 132, 134 as best seen in FIG. 2, thereby the rear of the carriage 2 to have a large opening so as to accommodate relatively tall lawns.

The first drive shaft 101 has bosses 152, 154 on which a pair of friction disks 156, 158 are mounted slidably in its axial direction for rotation therewith. A return spring 160 surrounds the first drive shaft 101 between the bosses 152, 154. A substantially cylindrical member 162 is provided between the bosses 152, 154 to ensure that the spring 160 remains free from dust. A friction roller 170 is mounted on the large-diameter pulley 35. Means are also provided, as at 180 and 180, to selectively engage the friction roller 170 with the friction disks 156 and 158.

Reference numeral 190 is a clutch roller adapted to be moved in a lateral direction by suitable means (not shown) to transmit drive between the pulleys 35 and 45 by tensioning the belt 46 or to stop transmitting such drive therebetween by loosening the same.

In this arrangement, when the engine speed is increased to a predetermined point, the clutch shoes 44 come into engagement with the inner surface of the clutch drum 42 to rotate the cutter shaft 51 and thus, the cutting blade 53 in a horizontal plane. At the same time, the small-diameter pulley 45 drives the belt 46 which in turn, drives the large-diameter pulley 35. In this state, the friction roller 170 comes into frictional engagement with a selected one of the friction disks 156 and 158 to rotate the first drive shaft 101 in a certain direction. Upon rotation of the first drive shaft 101, the sprocket 106 is rotated to drive the chain 120 which in turn, drives the sprocket 116. Then, the second drive shaft 110 is rotated to bring the pinions 122 and 124 into meshing engagement with the corresponding internal gears 126 and 128, thereby drivingly rotating the wheel 4, 4.

With reference again to FIG. 2, it will be appreciated that upon forward movement of the power lawn mower 1, since the carriage 2 has a sufficiently large opening at its front, smooth introduction of grass or other vegetation into the carriage 2 may be effected while smoothly discharging the lawn cuttings from the rear opening 27. It will also be appreciated that upon rearward movement of the carriage 2, since the second drive shaft 110 is located well above and forwardly of the independent wheel axle shafts 132 and 134 to provide a sufficiently large opening at the rear of carriage 2, the grass or other vegetation will be introduced into the carriage 2 at a small angle (as at $\theta$) and thus, the height of the cutting will be approximately, uniformly equal to the height of the cutting blade 53 from the ground.

While there has been described what is at present considered to be the preferred embodiment of the invention, it will be understood that the invention is not limited thereto, and that various changes and modifications may be made therein without departing from the scope thereof.

What is claimed is:

1. A power lawn mower for mowing lawns and cutting vegetation comprising:
   a carriage having a top deck and side walls;
   a pair of front wheels;
   a pair of rear wheels having a corresponding pair of wheel axle shafts;
   a cutting mechanism having a rotary cutting element;
   a prime mover mounted on the top deck of said carriage and having an output shaft drivingly connected to said cutting element to rotate the same; and
   a rear wheel drive mechanism for transmitting driving power of said prime mover to said rear wheels and including at least one drive shaft;
   said carriage including front and rear openings;
   said front wheels being independently supported on the front portion of said carriage;
   said rear wheels being independently supported on the rear portion of said carriage;
   said drive shaft being located above and forwardly of said wheel axle shafts; and
   said side walls of the carriage have forwardly and upwardly inclined ends and rearwardly and upwardly inclined ends respectively and said top deck has a forwardly and upwardly inclined portion and a rearwardly and upwardly inclined portion.

2. A power lawn mower according to claim 1, wherein a front guard member is swingably mounted to the lower surface of a forward portion of said top deck and a rear guard member is swingably mounted to the lower surface of a rearward portion of said top deck.

3. A power lawn mower according to claim 1, wherein said top deck includes concentric annular projections on its lower surface and said cutting mechanism includes a cover having a flanged end, said flanged end terminating a small radial distance from one of said annular projections while being spaced a small vertical distance from the lower surface of said top deck to form a folded path therein.

* * * * *

UNITED STATES PATENT AND TRADEMARK OFFICE
CERTIFICATE OF CORRECTION

PATENT NO. : 4,716,717
DATED : January 5, 1988
INVENTOR(S) : Ogano et al.

It is certified that error appears in the above-identified patent and that said Letters Patent is hereby corrected as shown below:

```
Column 1, line 16, change "integral" to --internal--.
          line 66, change "driving power" to --drive--;
change "drive" to --driving power--.
Column 2, line 46, change "an" to --a--.
Column 3, line 6, change "cuttng" to --cutting--.
          line 32, delete "the" (one occurrence).
Column 4, line 2, change "101" to --110--.
          line 26, after "thereby" insert --permitting--.
          line 59, change "wheel" to --wheels--.
```

Signed and Sealed this

Fifth Day of July, 1988

Attest:

DONALD J. QUIGG

*Attesting Officer*       *Commissioner of Patents and Trademarks*